US008782092B2

(12) United States Patent
Reilly

(10) Patent No.: US 8,782,092 B2
(45) Date of Patent: Jul. 15, 2014

(54) METHOD AND APPARATUS FOR STREAMING NETFLOW DATA ANALYSIS

(75) Inventor: Peter Reilly, Stillorgan (IE)

(73) Assignee: Fluke Corporation, Everett, WA (US)

(*) Notice: Subject to any disclaimer, the term of this patent is extended or adjusted under 35 U.S.C. 154(b) by 160 days.

(21) Appl. No.: 13/221,086

(22) Filed: Aug. 30, 2011

(65) Prior Publication Data
US 2012/0310952 A1 Dec. 6, 2012

(30) Foreign Application Priority Data
Jun. 3, 2011 (EP) .................................... 11168715

(51) Int. Cl.
*G06F 7/00* (2006.01)
*G06F 17/30* (2006.01)
*H04L 12/26* (2006.01)

(52) U.S. Cl.
CPC .............. *H04L 43/026* (2013.01); *H04L 43/04* (2013.01)
USPC ............ 707/801; 707/688; 707/689; 709/224

(58) Field of Classification Search
USPC .................................. 707/688, 689, 791, 782
See application file for complete search history.

(56) References Cited

U.S. PATENT DOCUMENTS

| 2003/0182291 | A1* | 9/2003 | Kurupati et al. ............... 707/100 |
| 2003/0187877 | A1* | 10/2003 | Kuboyama et al. ......... 707/104.1 |
| 2007/0078865 | A1* | 4/2007 | Smith ........................... 707/100 |
| 2009/0006607 | A1* | 1/2009 | Bu et al. ........................ 709/224 |

FOREIGN PATENT DOCUMENTS

| EP | 0542406 A1 | 5/1993 |
| EP | 2317697 A1 | 5/2011 |

OTHER PUBLICATIONS

M. Molina, A. Chiosi, S.D'Antonio, G. Ventre, "Design principles and algorithms for effective high-speed IP flow monitoring," 2006, computer communications 29, pp. 1653-1664.*
European Search Report, pp. 1-3.
Molina M et al: "Design principles and algorithms for effective high-speed IP flow monitoring", Computer Communications, Elsevier Science Publishers BV, Amsterdam, NL, vol. 29, No. 10, Jun. 19, 2006, pp. 1653-1664.
Sadasivan Rohati Systems N Brownlee Caida the Univeristy of Auckland B Claise Cisco Systems G et al: "Architecture for IP Flow Information Export; rfc5470.txt", Architecture for IP Flow Information Export; RFC5470.TXT, Internet Engineering Task Force, IETF; Standard, Internet Society (ISOC) 4, Rue Des Falaises CH-1205 Geneva, Switzerland, Mar. 1, 2009.

(Continued)

*Primary Examiner* — Robert Beausoliel, Jr.
*Assistant Examiner* — Hexing Liu
(74) *Attorney, Agent, or Firm* — Edwards Wildman Palmer LLP; Scott D. Wofsy; Christopher J. Capelli

(57) ABSTRACT

A system and method are described for progressively efficiently filtering and gathering netflow data. Flow records are analyzed to find out which keys (addresses, conversations, protocols etc) meet defined filter parameters. The netflow data is processed and a data structure of fixed size is continually maintained in order to facilitate efficient retrieval of the gathered netflow data.

12 Claims, 4 Drawing Sheets

(56) References Cited

OTHER PUBLICATIONS

Nevil Brownlee The University of Ackland Cyndi Mills GTE Laboratories et al: "Traffic Flow Measurement: Architecture ; draft-ietf-rtfm-architecture-08.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11AND ITU-T SG.16); URL: HTTP://WFTP3.ITU.INT/AV-ARCH/JCTVC-SITE/-17/03/2011, Internet Engineering Task Force, IETF, vol. rtfm, No. 8, Aug. 1, 1999.

* cited by examiner

Source IP Address

Destination IP Address

Next Hop IP Address

Inbound IF index

Outbound IF index

Packet Count

Byte Count

Flow Start Time

Flow End Time

Source Port

Destination Port

TCP Flags

IP Type of Service

Source Autonomous ID

Destination Autonomous ID

Source Mask Bits Count

Destination Mask Bits Count

Flow Record

FIG. 2

METHOD AND APPARATUS FOR STREAMING NETFLOW DATA ANALYSIS

CROSS-REFERENCE TO RELATED APPLICATIONS

This application is a U.S. patent application that claims the benefit of priority from EP Patent Application 11168715.8, filed Jun. 3, 2011.

BACKGROUND OF THE INVENTION

1. Field of the Invention

This invention relates to the network communications and usage analysis, and particularly to methods and apparatus for gathering and processing netflow data.

2. Background of the Invention

Packetized data networks are in widespread use transporting data throughout the world. Packetized data networks typically format data into packets for transmission between one computer and another. These packets include headers containing information relating to packet data and routing. The data networks send these packets from the originating computer to the destination computers using routers which send the packet on to the destination computer using the routing information in the packet header. A flow of packets are packets sent from a particular source network address and port to a destination network address and port.

As these networks have expanded the benefits of using them has increased. It is desirable to provide systems and tools that enable users to efficiently identify how the network is being used, in particular which hosts and networks are consuming network resources.

Most known netflow analyzing engines identify a number of source and/or destination IP addresses based on the volume of data associated with the IP address. In other words, conventional techniques do not consider the flow record data as a whole. This is disadvantageous since the user's flexibility to query specific information is limited.

It is an object of the present invention to provide a method and apparatus for efficient processing and analysis of netflow data and which enables greater flexibility in user-defined queries.

BRIEF SUMMARY OF THE INVENTION

Aspects of the present invention are set out in the accompanying claims.

According to one aspect of the present invention, the flow records are stored in a database in their entirety and can be queried in an ad hoc fashion by the user. The user can pick various combinations of the fields and values to define a key, and filter the flows based on any of the fields. The number of flows and the combination of fields that can be queried are typically significantly numerous, such that is not possible to merely utilize indexes in order to speed up the queries. Thus, according to another aspect of the present invention, the method and apparatus reads each flow record and filters it, extracts the keys which correspond to the fields of the flow records and their associated values, increments the values for each distinct key and presents the results to the user.

According to a further aspect of the invention, the user may be presented with a time series chart, wherein each time slot contains a predefined or desired number of the top N keys of that time slot. For example, N may be 10, and the top N may be identified based on the number of octets in the flows as filtered based on the defined key. One or more charts may be presented for each value, for example corresponding to the number of octets and/or the number of packets.

The method according to the present invention does not sort all the keys by the values and then present this to the user since, for a typical query, there can be millions of keys and a large amount of data making this technique unfeasible due to both the time and resources required to complete such a query. Due to such a query taking such a long time, the user would be deprived of any feedback on the progress of the query until ultimately complete.

The invention addresses this problem by applying two observations: 1) the user is generally only interested in the top 10 keys rather than in the order of the millions and 2) it would be useful to show the top 10 values whilst they are being discovered i.e. in real time as this will provide the user with feedback and useful information based on a sample of the data, before all the data has been processed.

In a preferred embodiment, the method and apparatus determines and provides only the most relevant information to the user. Furthermore, by repeatedly updating the top N values as soon as calculation is complete, it is ensured that the information provided is current. The system and method of the present invention thereby progressively and efficiently filters and gathers netflow data, using a data structure of fixed size that is continually maintained, in order to facilitate efficient retrieval of the gathered netflow data.

Arrangements embodying the invention will now be described by way of example with reference to the accompanying drawings.

BRIEF DESCRIPTION OF THE DRAWINGS

FIG. 2 is a block diagram illustrating the fields of each flow record that can be used in the definition of a key according to the present invention.

DETAILED DESCRIPTION OF THE INVENTION

Figure 1:
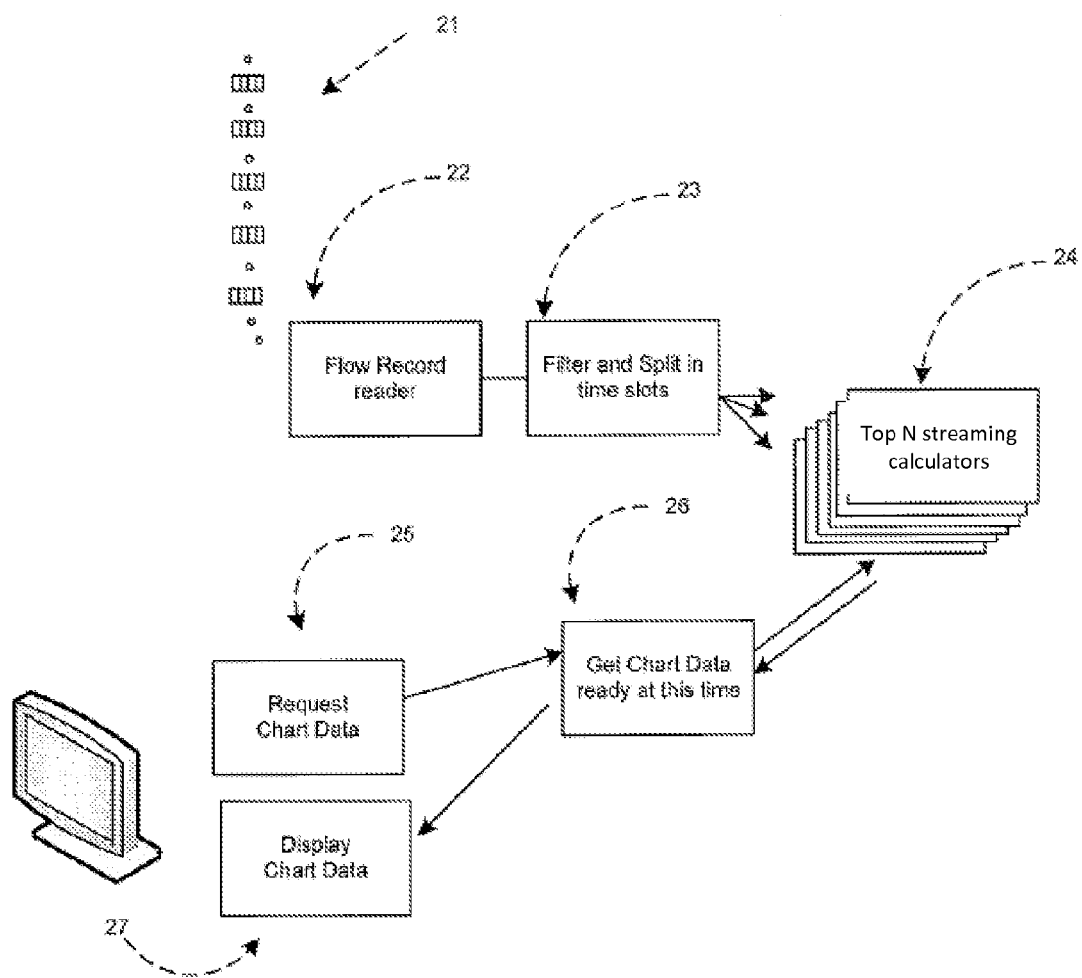
FIG. 1 is a block diagram illustrating the functional components and operations performed by the system of the present invention when a query is processed to filter the netflow data and output analysis results to the user.

FIG. 1 is a block flow diagram illustrating functional components of the netflow data analysis system and the operation of an exemplary implementation of the method according to an embodiment of the present invention. Flow records 21 are received 22, for example retrieved from a disk (not shown), and filtered 23 based on filter parameters. The filter parameters may be predefined by a user or may be received as input by way of a user query, and can be any combination of the fields in a netflow record. The filtered flow records, for example the flow records with respective field values that meet the defined filter parameters, are processed to extract a key representing the filtered flow record, and the associated values from the flow record. In this embodiment, the extracted key is an indicator representative of the one or more fields associated with the filter parameters. For example, for a user based query that is looking for the top 10 most active netflows for a particular IP address pair, the extracted key may be the combination of two integers, one integer representing the source IP address and the other integer representing the destination IP address. In this way, the extracted keys will be unique for each received flow record associated with a different address pair. Additionally, for this example user based query, the extracted values may be the size and/or the number of packets of the packets in the netflow.

In order to ensure efficient and accurate processing, in an embodiment, the time span of a query may be split into a plurality of predefined time slots, for example one second time slots, and a top N streaming calculator 24 created for each time slot. Each top N streaming calculator 24 processes the extracted key and values from the flow record in order to gather the filtered streaming netflow usage data in a processor-efficient manner, and to store the gathered data in an memory-efficient manner to facilitate subsequent efficient sorting and analysis, as will be described in more detail below.

A client software may request 25 the current state of the chart at a regular time interval i.e. every second. A software component 26 subsequently queries each top N calculator, compiles the information and creates a chart on the basis of the intermediate states returned. The chart is returned to the client software 27 which in turn renders the chart for the user. The percent of completion is returned for each of the time slots and if they are not complete, the client software sends a new request to get an update. This process continues until all the calculators are finished and the chart is complete.

FIG. 2 schematically illustrates the contents of an exemplary netflow record, containing relevant information about a flow of packets in an associated netflow. In an embodiment, the fields of the flow record may include:
  Source IP address
  Destination IP address
  Source IP port
  Destination IP port
  IP protocol
  Number of octets in the flow
  Number of packets in the flow
  Type of service As discussed above, any combination of the fields from the flow record may be used for an extracted key of the present invention. Those skilled in the art will appreciate that other fields available in the flow records may be used instead or in addition to the fields listed above, such as the number of distinct hosts or connections, the duration of netflow, and the size and/or number of packets of the reverse flow.

The filter parameters for a key may be defined by values or range of values for the associated field. Those skilled in the art will appreciate that many filter parameters are possible for each field available in the flow records. For example, a range of IP address values may be defined for example as a net mask, and a port range may be defined from a start value to an end value.

A flow record is emitted at a regular time interval, for example, each minute by a router for each flow. A long lived flow, for example, may generate many flow records.

The operation of processing a flow record according to the present invention will now be described with reference to FIG. 3 which is a diagram schematically illustrating the main data structures used by the top N calculator, and FIG. 4 which is a flow diagram according to the present embodiment.

Figure 3:
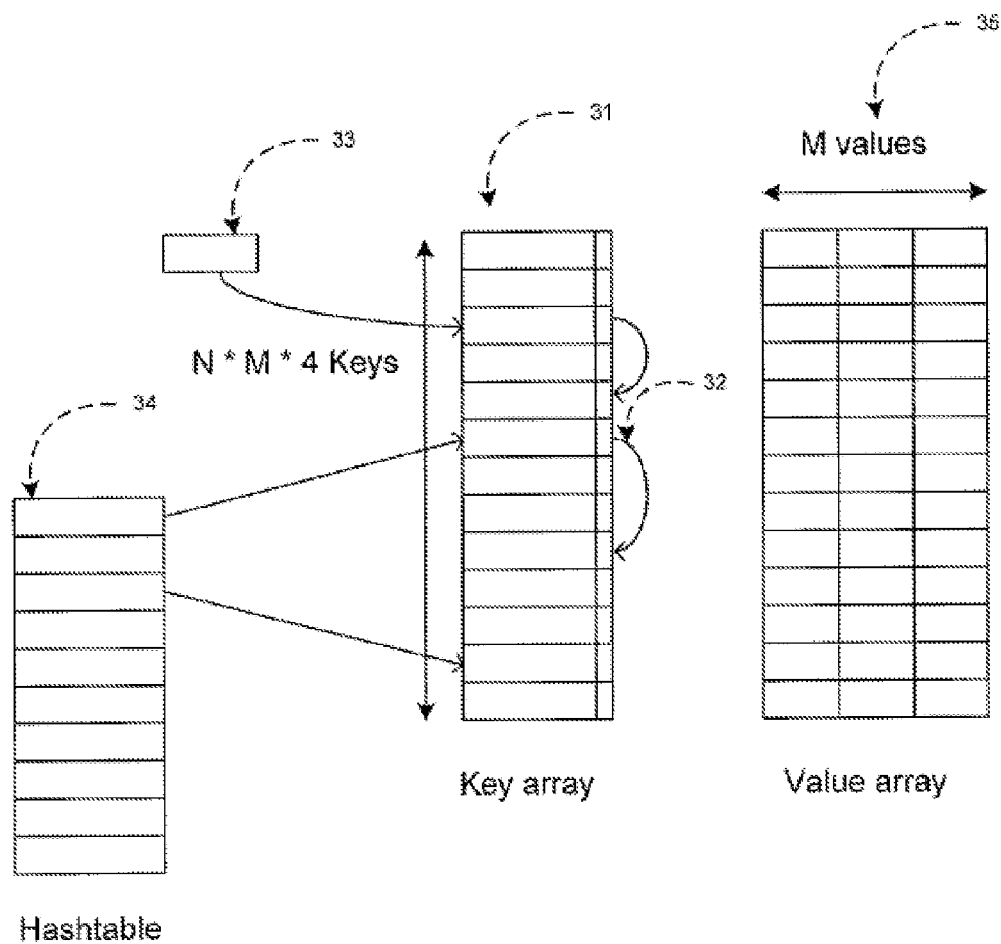
FIG. 3 is a diagram schematically illustrating the main data structures used by the top N calculator of the present invention.

As shown in FIG. 3, the present embodiment provides a data structure for facilitating efficient gathering of streaming netflow data, the data structure including a key array 31 and a value array 35. The key array 31 comprises a predefined number of elements, each element for storing an extracted key of a received flow record. The values associated with the key that are also extracted from the received flow record may be stored in a separate long array 35.

In the preferred embodiment, the size of the key array 31 is determined based on a predetermined number of the top N netflows to be returned from a sorted key array, so that a sufficient number of unique extracted keys are stored in the key array to allow the sorting to be based on a representative number of the netflow data that has been received and processed. For example, the number of elements in the key array 31 can be computed as the desired top n number N multiplied by the number of values M in the defined key, multiplied by a predetermined integer, such as 4.

A free list data structure 33 is provided for storing a list of the elements of the key array 31 that are available for storing a new extracted key as received and processed by the flow record reader 22 and filter 23. In this embodiment, the free list is a linked list data structure, and the start of the free list 33 is stored as a pointer to the first free element in the key array 31. Initially all the key array elements are placed in the free list linked list, with each element including a pointer 32 to a next free element in the linked list 33. As keys are populated in the key array 31, the position indicated by the start of the free list 33 is used to determine the location in the key array 31 to add the new key. After the element is added at that location, the pointer for the start of the free list is updated with the pointer from the newly populated element.

To allow quick lookup, keys may be hashed and placed in a list illustrated by a hash table 34.

Figure 4:
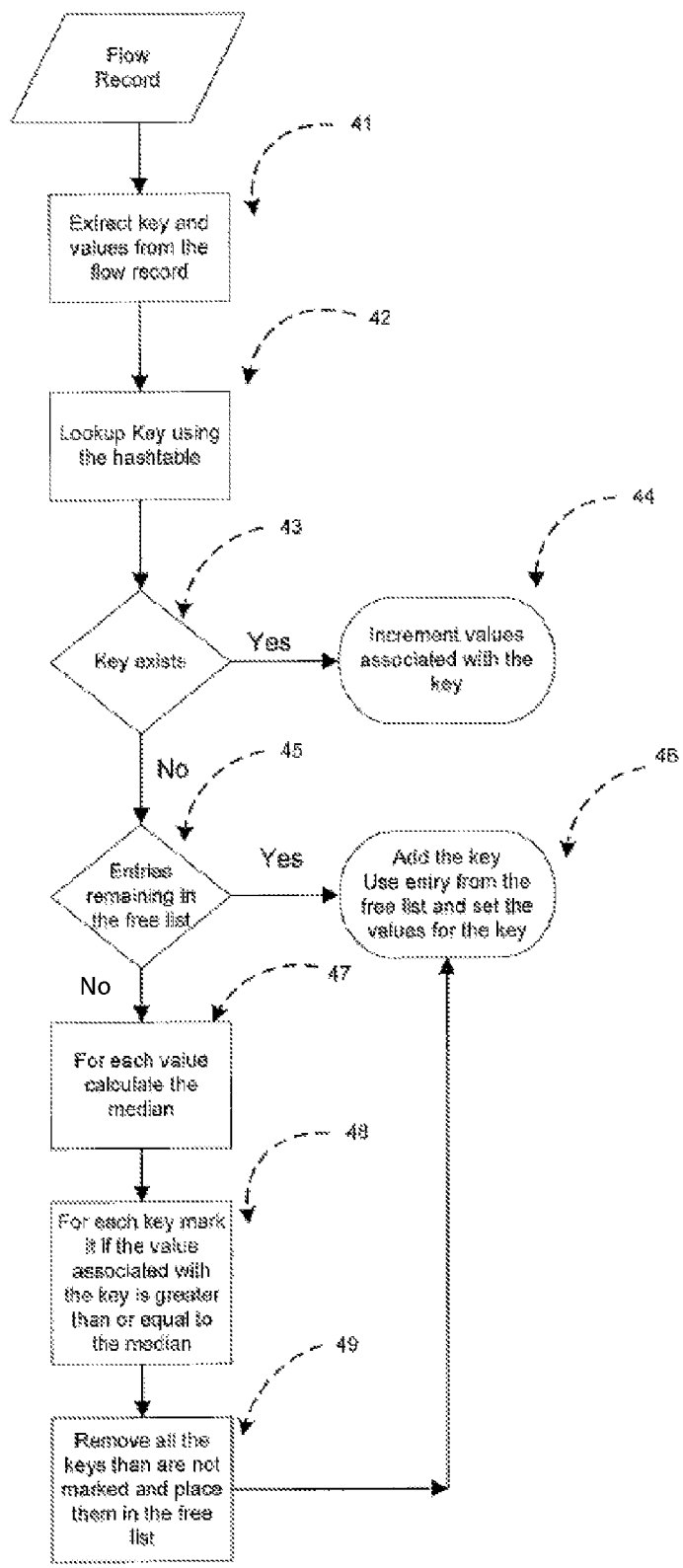
FIG. 4 is a flow diagram of the operation of processing a flow record according to an embodiment of the present invention.

Referring now to FIG. 4, the process for adding a flow record to the data structure illustrated in FIG. 3 starts with a new flow record being received by the flow record reader 22 and passed to the filter 23 for processing based on the key, for example as defined in a user's query. At step 41, the key and the values of the flow record (for example the number of octets and the number of packets) are extracted from the flow record. At step 42, the extracted key is looked up using the hashtable. If, at step 43, it is determined that the extracted key is already in the data structure, the hash table efficiently identifies the location of that key in the key array 31, and the values associated with the key are incremented at step 44. However, if at step 43, it is determined that the key does not exist in the data structure, then at step 45, the free list is checked to determine if there are any free entries remaining in the key array 31. In this embodiment, the presence of a pointer as the start of the free list 33 indicates that there is at least one free entry in the key array 31. If it determined that there is a free entry in the free list, then at step 46 the extracted key is added to the key array 31 at the location identified by the start pointer. The extracted values are also added to corresponding locations in the value array at step 46.

However, if it is determined at step 45 that there are not any entries free in the key array 31, the process thus needs to remove entries to allow the new flow record to be added. This is achieved in this embodiment by retrieving the stored values for a particular field of each key in the key array 31, and determining at step 47 the median of the stored values for that field. At step 48, all the entries in the key array 31 are then processed and marked when it is determined that the value associated with the key are lower that the corresponding median. Those skilled in the art will appreciate that steps 47 and 48 can be repeated for each of the extracted values corresponding to a field of the flow record. The keys which are marked are then removed from the key array at step 49.

By virtue of removing entries of keys whose associated values are lower than a predetermined threshold such as the median, sorting of the numerous entries may be avoided unless absolutely necessary. This prevents an undesired waste of resources which would otherwise be used for performing the sorting procedure.

While the top N streaming calculators are calculating the top N keys for each value position in the data structures, the client code 16 may ask for the top N values (referring to FIG. 1.). To enable this, the access to the data structures illustrated in FIG. 3 may be protected by locks which enable multi-threaded access.

In the above description, the netflow data analysis system is arranged to store and execute software which controls the operation to perform the method described above. As those skilled in the art will appreciate, a computer program for configuring a programmable device to become operable to perform the above method may be stored on a carrier and loaded into memory, such as a flash memory of the system. The program may be downloaded as a signal and/or may be applied as a patch or update to software already resident on the system. The scope of the present invention includes the program, the carrier carrying the program and the broadcast signal.

Alternative Embodiments

The embodiments are described above purely by way of example, and variations may occur to the skilled person on reading the description, which nevertheless fall within the scope of the invention as defined by the claims.

For example, in the embodiments described above, the top N streaming calculator is arranged to perform a statistical analysis of the values associated with the keys stored in the key array and to remove at least one of the stored indicators based on the statistical analysis. In the exemplary embodiment, the statistical analysis involves calculating the median of the values associated with the stored keys, and removing the keys with associated values that are less than the calculated median. Using the median for the statistical analysis is particular advantageous as the entries that are subsequently removed from the key array do not result in significant loss of information for the purposes of representing overall network usage. However, those skilled in the art will appreciate that other forms of statistical analysis may be used instead of using the median, such as calculating the mean, mode or other form of statistical average.

Embodiments of the present invention may be implemented using hardware, software or a combination thereof and may be implemented in one or more computing systems or other processing systems.

The invention claimed is:

1. An apparatus, comprising:
a processing system comprising at least one processor and a memory storing a set of computer instructions, the processing system is arranged to cause the apparatus to:
receive a plurality of flow records;
filter information contained in the plurality of flow records based on defined filter parameters;
extract an indicator associated with the filtered flow record;
store a predetermined number of indicators in an indicator data structure;
determine if the indicator data structure has a capacity to store an additional indicator;
add the extracted indicator to the data structure when it is determined that the indicator data structure has the capacity;
analyze the extracted indicators stored in the data structure to remove at least one of the stored extracted indicators when it is determined that the indicator data structure does not have the capacity to store an additional indicator wherein the step of analyzing further comprises calculating the median of each value associated with the stored indicators and removing the stored indicators with associated values that are less than the calculated median; and
store in a hash table a plurality of indicators that are stored in the indicator data structure; and
determine whether an extracted indicator is stored in the indicator data structure by performing a lookup of the indicator using the hash table.

2. The apparatus of claim 1, wherein the processing system is further arranged to cause the apparatus to:
extract values from the filtered flow record; a value data structure for storing values associated with the stored indicators; and
add the extracted values to the value data structure.

3. The apparatus of claim 1, wherein the processing system is arranged to cause the apparatus to:
filter information contained in the plurality of flow records by comparing at least one value from a field of a flow record with a filter parameter defined for that field.

4. The apparatus of claim 1, wherein the processing system is arranged to cause the apparatus to:
increment a value of the extracted indicator when it is determined that the extracted indicator is already stored in the indicator data structure.

5. The apparatus of claim 1, wherein the indicator data structure is a linked list and wherein empty elements of the indicator data structure are linked together as a free list.

6. The apparatus of claim 5, wherein the processing system is arranged to cause the apparatus to:
provide a free list start location comprising a pointer to a first empty element of the free list.

7. The apparatus of claim 1, wherein the processing system is arranged to cause the apparatus to:
analyze the extracted indicators stored in the data structure by performing a statistical analysis of the values associated with the stored indicators and to remove at least one of the stored indicators based on the statistical analysis.

8. The apparatus of claim 1, wherein the defined filter parameters comprise one or more of a source IP address, a destination IP address, a source IP port, a destination IP port, an IP protocol version, a number of octets in the flow, a number of packets in the flow, and a type of service.

9. The apparatus of claim 1, wherein the processing system is further arranged to cause the apparatus to:
store the indicator data structure; and
identify a predetermined number of stored indicators from the sorted indicator data structure.

10. The apparatus of claim 9, wherein the processing system is further arranged to cause the apparatus to:
create a chart based on the identified predetermined number of stored indicators for repeatedly updating the chart with the values as flow records are processed by the system.

11. A method for gathering netflow data by a processing system comprising at least one processor and a memory storing a computer instruction, which are adopted to perform the method comprising:
receiving a plurality of flow records;
filtering information contained in the plurality of flow records based on defined filter parameters;
extracting an indicator associated with the filtered flow record;
providing an indicator data structure for storing a predetermined number of indicators;

for each extracted indicator, determining if the indicator data structure has a capacity to store an additional indicator, and:
if it is determined that the indicator data structure has the capacity, adding the extracted indicator to the data structure;
if it is determined that the indicator data structure does not have the capacity to store an additional indicator, analyzing the extracted indicators stored in the data structure to remove at least one of the stored extracted indicators before adding the extracted indicator to the data structure wherein the step of analyzing further comprises calculating the median of each value associated with the stored indicators and removing the stored indicators with associated values that are less than the calculated median; and
store in a hash table a plurality of indicators that are stored in the indicator data structure; and
determine whether an extracted indicator is stored in the indicator data structure by performing a lookup of the indicator using the hash table.

12. A non-transitory computer readable storage medium and one or more computer programs embedded therein, the computer programs comprising instructions, which when executed by a computer system, cause the computer system to:

receive a plurality of flow records;
filter information contained in the plurality of flow records based on defined filter parameters;
extract an indicator associated with the filtered flow record;
store a predetermined number of indicators in an indicator data structure;
determine if the indicator data structure has a capacity to store an additional indicator;
add the extracted indicator to the data structure when it is determined that the indicator data structure has the capacity; and
analyze the extracted indicators stored in the data structure to remove at least one of the stored extracted indicators when it is determined that the indicator data structure does not have the capacity to store an additional indicator wherein the step of analyze further comprises calculating the median of each value associated with the stored indicators and removing the stored indicators with associated values that are less than the calculated median; and
store in a hash table a plurality of indicators that are stored in the indicator data structure; and
determine whether an extracted indicator is stored in the indicator data structure by performing a lookup of the indicator using the hash table.

* * * * *